United States Patent
Schutzbach et al.

(10) Patent No.: US 7,424,374 B2
(45) Date of Patent: *Sep. 9, 2008

(54) FLOW TRANSPORT ANALYSIS METHOD AND SYSTEM

(75) Inventors: James S. Schutzbach, Madison, AL (US); Patrick L. Stevens, Indianapolis, IN (US)

(73) Assignee: ADS, LLC, Huntsville, AL (US)

( * ) Notice: Subject to any disclaimer, the term of this patent is extended or adjusted under 35 U.S.C. 154(b) by 547 days.

This patent is subject to a terminal disclaimer.

(21) Appl. No.: 10/757,446

(22) Filed: Jan. 15, 2004

(65) Prior Publication Data

US 2006/0116829 A1 Jun. 1, 2006

(51) Int. Cl.
- G01F 1/00 (2006.01)
- G01F 7/00 (2006.01)
- G04F 1/00 (2006.01)
- G04F 3/00 (2006.01)
- G04F 5/00 (2006.01)
- G04F 7/00 (2006.01)
- G04F 10/00 (2006.01)

(52) U.S. Cl. .................................. 702/45; 702/176
(58) Field of Classification Search .................. 702/45
See application file for complete search history.

(56) References Cited

U.S. PATENT DOCUMENTS

| | | | |
|---|---|---|---|
| 4,024,760 A | 5/1977 | Estrada, Jr. | |
| 4,109,523 A | 8/1978 | Teyssandier | |
| 4,211,111 A * | 7/1980 | Petroff | 73/195 |
| 4,630,474 A | 12/1986 | Petroff | |
| 4,700,568 A | 10/1987 | Sleffel | |
| 4,782,711 A * | 11/1988 | Pratt | 73/861.356 |
| 4,841,780 A | 6/1989 | Inada et al. | |
| 5,035,147 A | 7/1991 | Woodward | |
| 5,198,989 A | 3/1993 | Petroff | |
| 5,367,911 A * | 11/1994 | Jewell et al. | 73/861.08 |
| 5,448,476 A | 9/1995 | Kurokawa et al. | |
| 5,526,696 A | 6/1996 | Cappi | |
| 5,808,195 A | 9/1998 | Byrd | |
| 5,986,553 A * | 11/1999 | Young | 340/606 |
| 6,209,388 B1 * | 4/2001 | Letton et al. | 73/61.79 |

FOREIGN PATENT DOCUMENTS

JP 11-201812 * 7/1999

* cited by examiner

*Primary Examiner*—Michael P Nghiem
(74) *Attorney, Agent, or Firm*—Lanier Ford Shaver & Payne P.C.; George P. Kobler

(57) ABSTRACT

A method and system for analyzing flow of a substance in a sewer system determines a first flow velocity at a first location and a second flow velocity at a second location. Using a processor, the travel time between the two locations is determined using only the flow velocities and a constant. The travel time may then be used to provide a substantially accurate determination of net flow between the two locations.

20 Claims, 7 Drawing Sheets

$TT_1 \neq TT_2$ ns, and an understanding of what flow is expected to occur at a downstream point based on upstream conditions, can help determine—and to predict—when network problems such as leaks, breaks, clogs and other blockages and overflows may occur. They can also help system engineers and designers understand when additional capacity must be built into the system, as well as to help them better manage a network with its existing capacity.
FLOW TRANSPORT ANALYSIS METHOD AND SYSTEM This application claims the benefit of U.S. application Ser. No. 09/839,050, now U.S. Pat. No. 6,757,623 filed Apr. 20, 2001. The entire contents of this prior application are incorporated herein by reference.

FIELD OF THE INVENTION

The present invention relates generally to flow monitoring systems in a sewer network. More particularly, the present invention relates to a method and system for determining the time corresponding to the flow of a fluid from one point in a network to another without requiring detailed information about the system, such as the distance between the two points or the number or character of sources between the points.

BACKGROUND OF THE INVENTION

Tools for the accurate measurement of flow in a sewer network are an important resource for managers, mechanics, engineers, and regulators of municipal and industrial sewer networks. Accurate measurements of flow between points, and an understanding of what flow is expected to occur at a downstream point based on upstream conditions, can help determine—and to predict—when network problems such as leaks, breaks, clogs and other blockages and overflows may occur. They can also help system engineers and designers understand when additional capacity must be built into the system, as well as to help them better manage a network with its existing capacity.

One key parameter that is measured in a sewer network is the net flow between two or more points. At a basic level, the volume of flow at a downstream location minus the volume of flow at an upstream location is considered to be the net flow between the two locations. The downstream location volume is typically higher than that of the upstream location under normal conditions, as discharge sources, rainwater inflow and infiltration, and/or other sources may introduce wastewater into the network between the upstream and downstream locations. If the net flow between the two locations decreases below what is expected, or if net flow becomes negative, the network manager should investigate to determine whether a leak, break, clog, or overflow is occurring.

However, the above-described general calculation of net flow does not consider that it takes time for a particular flow element to travel from the upstream location to the downstream location, nor does it consider that such time may vary. Thus, because of the "travel time," by the time that a flow reaches a downstream location from an upstream location, the conditions at the upstream location may have become significantly different due to changes in input volumes, changes in weather conditions, or any number of conditions. Thus, the traditional way of calculating net flow is not desirable because it does not account for travel time or variations in travel time.

Sewer network managers have tried to compensate for the above-described problem in two ways. The first way is to use a larger number of monitoring points in the network, so that conditions are not likely to significantly change during the time that it takes wastewater to flow from one monitor to the next. However, flow monitors can be very expensive to purchase and costly to maintain. Thus, this solution is not desirable because it is not cost-effective, and it is often cost-prohibitive. In addition, the solution still does not account for the travel time between the monitors that are installed.

The second way is to perform detailed modeling of travel time, based on volumes of network design specifications and flow data. Such modeling exercises are time-consuming, costly, and only provide a snapshot of an anticipated travel time that matches the conditions under which the modeling occurred.

Thus, if a method and system for determining travel time in a sewer network were available that could determine the travel time in real time, using a small number of monitors and relatively little input data, significant cost savings would result, and sewer network managers would be better able to manage, predict conditions, anticipate design requirements, and respond to problems in their networks.

Accordingly, it is desirable to provide an improved method and system for analyzing flow in a sewer network that includes the real-time derivation of the time that it takes for a flow to travel between points in the network.

SUMMARY OF THE INVENTION

It is therefore a feature and advantage of the present invention to provide an improved method and system for analyzing flow in a sewer network that includes the real-time derivation of the time that it takes for a flow to travel between points in the network.

In accordance with a preferred embodiment of the present invention, a method of analyzing flow of a substance in a sewer network includes the steps of collecting first data representative of a first flow velocity of a substance at a first location, as well as collecting second data representative a second flow velocity of the substance at a second location. In a preferred embodiment, the method also includes transmitting, via at least one communications link, the first data and second data to a processor. The processor determines a travel time corresponding to travel of the substance between the first location and the second location using only the first data, the second data, and a constant. Preferably the processor does not require additional data relating to the sewer network or the substance.

Optionally, the method also includes the steps of detecting a first flow volume at the first location at a first time and detecting a second flow volume at the second location at a second time. The second time is a function of the first time and the travel time. The option also includes transmitting the first flow volume and the second flow volume to a processor. The processor determines a net flow corresponding to a difference between the second flow volume and the first flow volume.

Optionally, the determining step comprises divides the constant by either a sum or an average of the first data and the second data.

Optionally, the constant corresponds to or is determined by historic flow volume data for the first location and historic flow volume data for the second location over multiple time increments. As used herein, the word "historic" does not imply any particular age, and can include the immediate past, even as close as a previous hour, minute, or second, as well as longer periods. To derive the constant, the method includes developing a distribution of first flow volume data from the first flow monitor over a period of time and a distribution of second flow volume data from the second flow monitor over a period of time. The constant corresponds to a goodness of fit test performed on the distributions.

As an additional option, the processor is integral with a flow meter that is located at either the first location or the second location.

In accordance with another embodiment of the present invention, a system for analyzing flow of a substance between a first location and a second location, includes a first meter capable of detecting a first flow velocity at a first location and a second meter capable of detecting a second flow velocity at a second location. The first meter and the second meter are in communication with a processor, and the processor is programmed to derive a travel time of a flow from the first location to the second location using the first flow velocity, the second flow velocity, and a constant. In a preferred embodiment of the present invention, no additional data relating to the flow or the locations are required.

Optionally, the first meter is also capable of detecting a first flow volume at the first location at a first time, the second meter is also capable of detecting a second flow volume at the second location at a second time. The second time corresponds to a sum of the first time and the travel time, and the processor is further programmed to determine a net flow based on the difference between the second flow volume and the first flow volume.

Optionally, the first location and the second location are locations within a sewer network. As a further option, the processor may be integral with the first or second meter.

In accordance with another embodiment of the present invention, a method of analyzing flow of a substance in a sewer network includes the steps of using multiple upstream flow meters to collect upstream flow volume data points corresponding to each upstream flow meter over a period of time, using a downstream flow meter to collect a downstream flow volume data point, and determining a travel time corresponding to travel of a substance between an upstream location corresponding to one of the upstream flow meters and a downstream location, the downstream location corresponding to the downstream flow meter, using the plurality of upstream flow volume data points, the downstream flow volume data point, and a constant, without requiring additional data relating to the sewer network or the substance. Optionally, the method also includes the steps of detecting a first flow volume at the upstream location at a first time, detecting a second flow volume at the downstream location at a second time that is a function of the first time and the travel time, and determining a net flow corresponding to a difference between the downstream flow volume and the upstream flow volume.

In accordance with another embodiment of the present invention, a method of analyzing flow of a substance includes the steps of collecting a first set of flow volume data at a first location over a multiple time increments, collecting a second set of flow volume data at a second location over a corresponding number of time increments, identifying a first distribution of the first set of flow volume data over time, identifying a second distribution of the second set of flow volume data over time, identifying a constant corresponding to a relation of the first distribution and the second distribution, detecting a first flow velocity at the first location, detecting a second flow velocity at the second location, and determining a transport time corresponding to transport of a substance from the first location using the first flow velocity, the second flow velocity, and the constant, without requiring additional data. Optionally, the method also includes using the first flow meter at a first time, to detect an upstream flow volume, using the second flow meter at a second time being the sum of the first time and the transport time to detect a downstream flow volume, and calculating a net flow corresponding to a difference between the downstream flow volume and the upstream flow volume. Optionally, the relation in the identifying step comprises a goodness of fit test.

In accordance with an additional embodiment of the present invention, a method of analyzing flow of a substance in a sewer network includes the steps of using a plurality of upstream flow meters to collect a plurality of sets of upstream flow volume data corresponding to each upstream flow meter over a period of time, using a downstream flow meter to collect a set of downstream flow volume data over the period of time, identifying a plurality of upstream distributions corresponding to a set of upstream flow volume data over time, identifying a downstream distribution corresponding to the set of downstream flow volume data over time, identifying a constant corresponding to a relation of the upstream distributions and the downstream distribution, detecting a first flow velocity at an upstream location corresponding to one of the upstream flow meters, detecting a second flow velocity at a downstream location corresponding to the downstream flow meter, and determining a transport time corresponding to transport of a substance from the upstream location to the downstream location using the first flow velocity, the second flow velocity, and the constant, wherein the determining step does not require additional data. Optionally, the method also includes using a first flow meter at the first upstream location at a first time to detect an upstream flow volume, using the downstream flow meter at a time corresponding to a sum of the first time and the travel time to detect a downstream flow volume, and calculating a net flow corresponding to a difference between the downstream flow volume and the upstream flow volume. Optionally, the relation in the identifying step comprises a goodness of fit test.

There have thus been outlined the more important features of the invention in order that the detailed description thereof that follows may be better understood, and in order that the present contribution to the art may be better appreciated. There are, of course, additional features of the invention that will be described below and which will form at least part of the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract included below, are for the purpose of description and should not be regarded as limiting in any way.

As such, those skilled in the art will appreciate that the concept and objectives, upon which this disclosure is based, may be readily utilized as a basis for the design of other structures, methods and systems for carrying out the several purposes of the present invention.

DETAILED DESCRIPTION OF PREFERRED EMBODIMENTS OF THE INVENTION

A preferred embodiment of the present invention provides a method and system for determining, in real time, the time that it will take for a substance to flow from one point to another in a sewer network using measured data corresponding to the flow, without requiring detailed information about the system, such as the distance or the characteristics of the sewer network. Once determined, this travel time may be used to provide a more accurate measurement of net flow between the two points, thus enhancing the ability of a system manager, engineer, or operator to detect discrepancies and/or unexpected network conditions.

Figure 1:
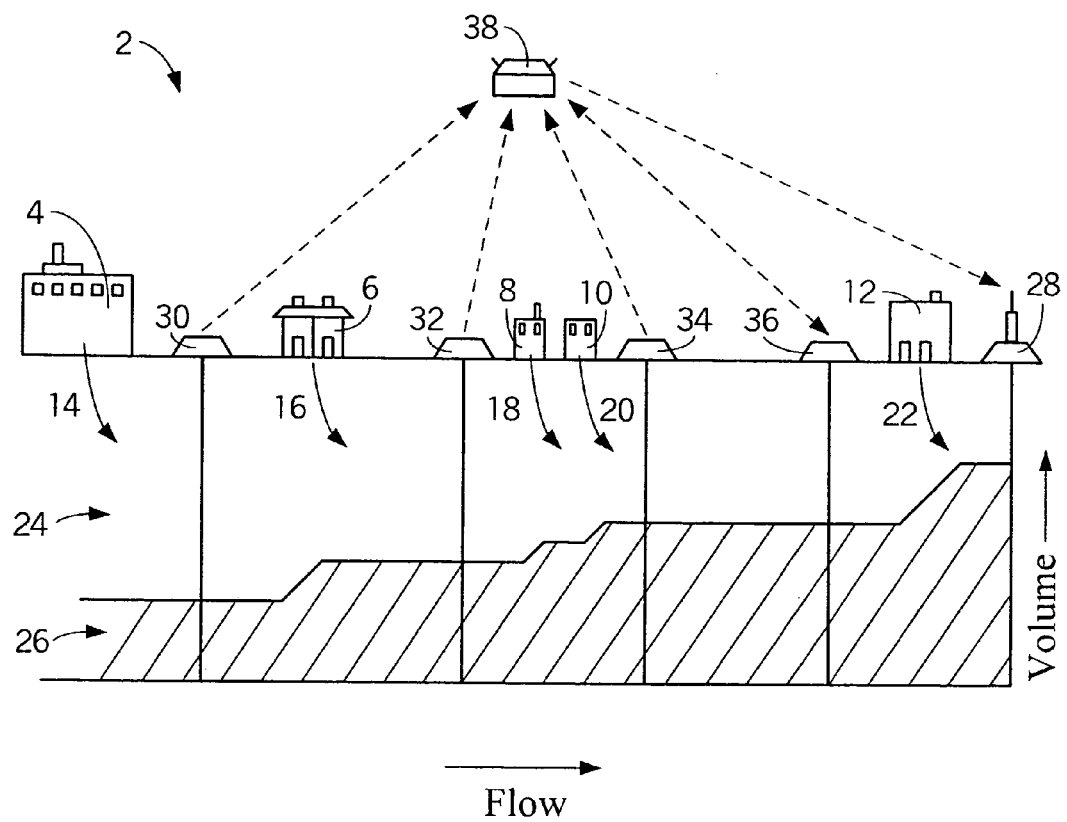
FIG. 1 illustrates an example of the implementation of components of the present inventive system in a typical sewer network.

An illustration of a preferred embodiment of the present inventive system in an exemplary sewer system apparatus and method is illustrated in FIG. 1. Referring to FIG. 1, a sewer basin area 2 includes one or more wastewater discharge sources such as 4, 6, 8, 10, and 12 that discharge wastewater 14, 16, 18, 20, and 22 into a sewer network 24. The volume of wastewater 26 in the sewer network increases as more wastewater is introduced into the network by the sources, and the wastewater flows through the network 24 toward a wastewater treatment plant. A plurality of flow meters or monitors 30, 32, 34, and 36 are positioned at various locations in the network 24. The meters may be of any standard design or type that is capable of measuring flow velocity, either directly or indirectly by performing calculations on one or more measured parameters. Such a meter is described in, for example, U.S. Pat. No. 5,198,989, to Petroff; U.S. Pat. No. 4,630,474, to Petroff; and U.S. Pat. No. 4,397,191, to Forden. Preferably, the monitors are also capable of measuring flow volume, either directly or indirectly by performing calculations on one or more measured parameters. Optionally, the monitors also may be capable of performing any other type of measurement, such as temperature or depth of the flow.

The monitors preferably include communications capability such that data from at least two of the monitors may be delivered to a processor directly. For example, as illustrated in FIG. 1, monitors 30, 32, 34 and 36 may transmit the data that they collect via a wireless transmission to a remote satellite 38, which relays the signal to a processor 28 such as one located at the wastewater treatment plant. Optionally, the processor 28 may be located at any other location. For example, the processor may be located at one of the monitors, such as monitor 36 illustrated in FIG. 1, in which case the transmission of data measured by monitor 36 could be accomplished through direct or substantially direct delivery of a signal from a monitor sensor to the processor. The wireless transmission to a satellite illustrated in FIG. 1 is only an example of one form of communication that may be used. Any method or system that delivers the data collected by at least two monitors to a processor, such as a radio transmitter/receiver system, dial-in phone lines, Internet connectivity, or even direct wiring may be used.

The amount and the locations of the monitors, wastewater sources, and flow volumes illustrated in FIG. 1 are merely intended as illustrative of an example of a sewer network that is equipped with the present invention. Any number and location of monitors and wastewater source may be used. For example, the network may include only one upstream monitor and one downstream monitor. In the alternative, multiple upstream monitors may be used with a downstream monitor.

Figure 2:
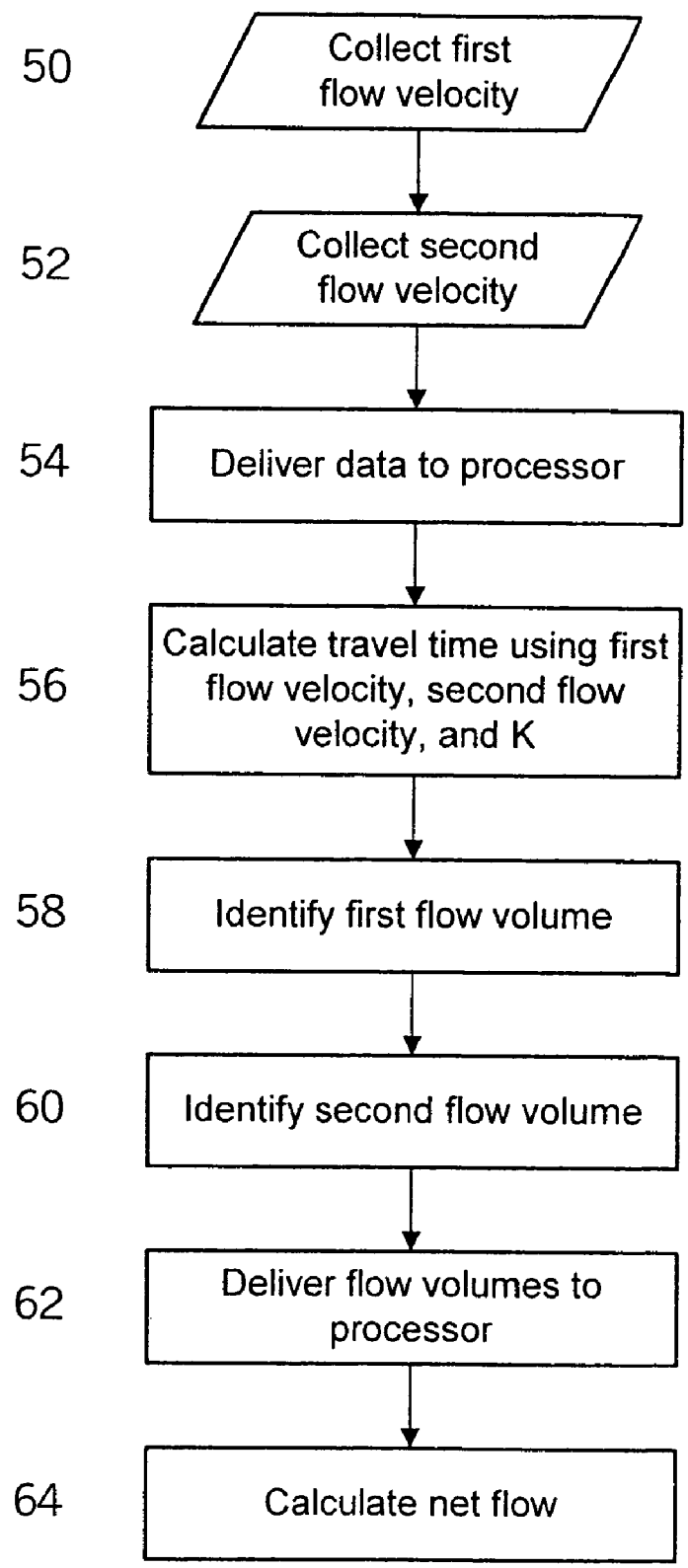
FIG. 2 is a flowchart that identifies the steps that a preferred embodiment of the present inventive method may follow along with an exemplary use for the travel time derived by the present invention.

The processor uses the flow velocity data collected by at least two of the monitors to determine the time that it takes a substance to travel between two points within the sewer network. The steps that the processor may perform to achieve this determination, along with the other steps taken by an exemplary method embodiment of the present invention, are illustrated in FIG. 2. Referring to FIG. 2, a first flow velocity is collected 50 by a first flow meter. A second flow velocity is collected 52 by a second meter, and the first flow velocity and the second flow velocity are delivered 54, by direct wiring, radio transmission, cellular transmission, Internet link, or any other communications medium to a processor. As noted above, the processor may be separate from the monitors, or it may be integral with one of the monitors such that communication by such monitor is not required except to deliver the data from the sensor to the integral processor. Also optionally, each monitor may communicate via the same type of communications medium, or different monitors may use different media.

After the data is received by the processor, the processor calculates 56 the time that it took a substance in the network to travel from the location of the first monitor to the location of the second monitor using only the first flow velocity, the second flow velocity, and a predetermined constant. Preferably, this calculation comprises dividing the predetermined constant by the average of the first and second flow velocities. Optionally, the calculation may comprise dividing the predetermined constant by the sum of the first and second flow velocities. This calculation may be performed at multiple times and/or locations to identify multiple travel times.

The constant is a predetermined, sewer network-dependent value. It also depends upon the individual meters within the network for which a travel time calculation is desired. The number of possible constants relates to the number of monitors in the network. For example, if there are four monitors in a network in series, represented for the purpose of discussion as monitors A, B, C, and D, there could be an A-B constant, a B-C constant, a C-D constant, an A-C constant, a A-D constant, a B-D constant, and a C-D constant. Not all such constants may apply, or additional constants may apply, depending on the locations of the monitors in the network and in relation to each other. Although it is possible that some of the constants could be the same, is not a requirement of the present invention that the constants be the same. The constant is preferably derived by studying the volume and travel time within the network over a period of time. Although travel times within a network will likely vary at different times and on different days as external factors such as flow volume, source input volume, and inflow and infiltration of rainwater occur, it has been surprisingly found that the constant will remain relatively unchanged. Preferably, the constant is determined and/or calibrated on a periodic basis, such as weekly, monthly, bimonthly, or any other period to account for changes to the sewer network over time.

Figure 3:
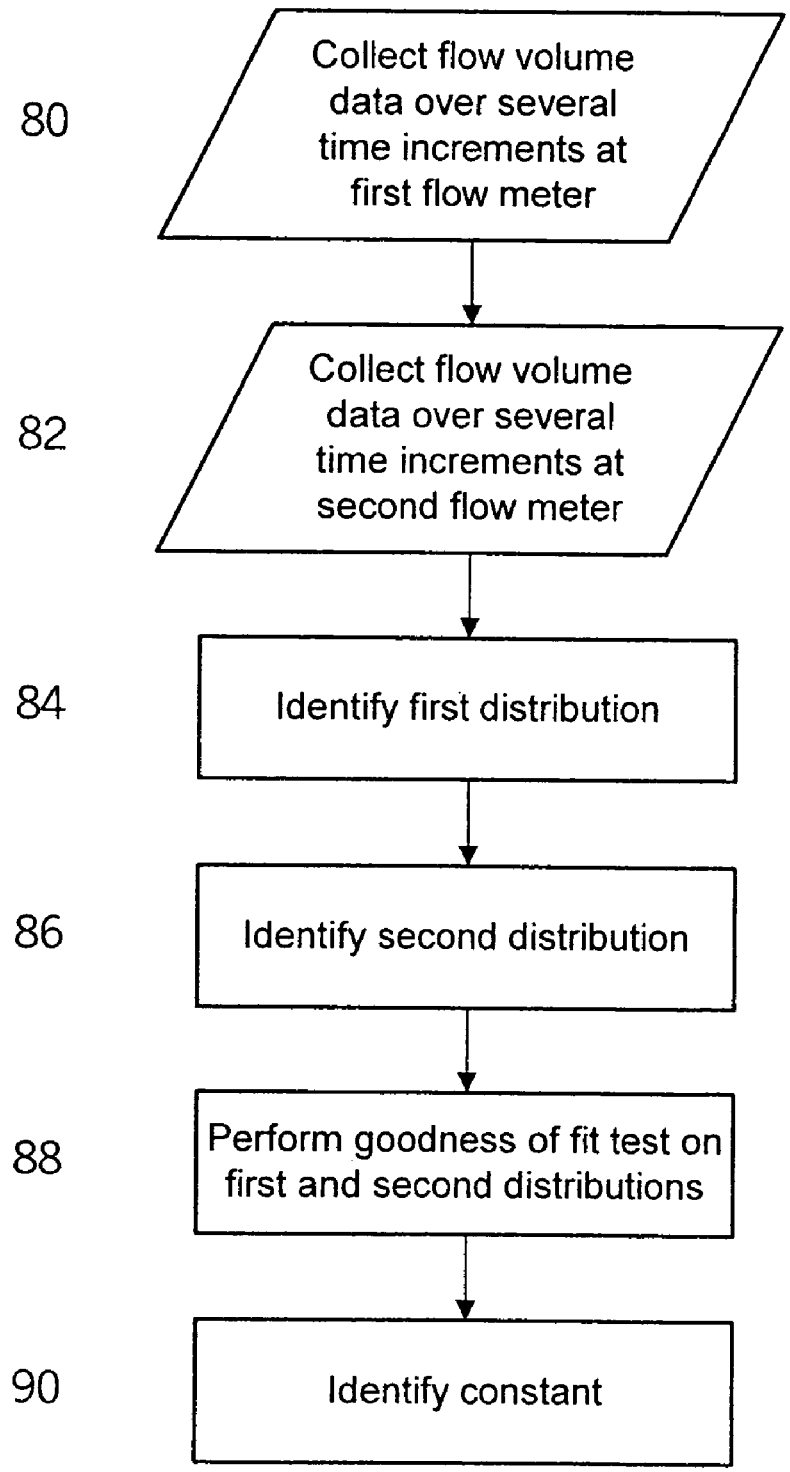
FIG. 3 is a flowchart that identifies the steps that an additional element of a preferred embodiment of the present inventive method may follow.

FIG. 3 illustrates the steps that may be used to derive a constant in accordance with a preferred embodiment of the present invention. First, a first flow meter collects 80 flow volume data at a first location over a plurality of time increments, such as ten-minute intervals, half-hour intervals, hourly intervals, daily intervals, or any interval. Only two such time increments are required, but the use of more time increments will likely result in a more accurate constant derivation. Similarly, a second flow meter collects 82 flow volume data over a plurality of time intervals that may or may not be the same as those for the first flow meter measurements. A processor identifies, such as through a scatterplot or hydrograph such as the examples illustrated in FIG. 4, a first distribution of the flow volume data from the first meter over time 84 and a second distribution of the flow volume data from the second meter over time 86. The first distribution and the second distribution are then compared, using a "best fit" or "goodness of fit" test, to arrive at the constant that most closely results in a best fit between the distributions. The goodness of fit test may be any commonly used goodness of fit test, such as the Kolmogorov-Smirnov test. the Pearson's chi-square test, or any other such test. Preferably, the test is the Pearson's goodness of fit test and the constant is the Pearson's correlation coefficient.

Once calculated, the travel time can be used to calculate an accurate net flow between the locations of the two monitors in the sewer system. Referring again to FIG. 2, the first and second monitors are used to detect a first flow volume 58 at the location of the first monitor and a second flow volume 60 at the location of the second monitor. The first flow volume is collected at a first time, and the second flow volume is collected at a time that corresponds to the first time plus the travel time. The flow volumes are then delivered 62 to a processor where the processor determines the net flow 64 between the first location and the second location by calculating the difference between the second flow volume and the first flow volume. As with the delivery of volume data to the processor in step 54, the delivery of volume data to the processor in step 62 may be by direct wiring, radio transmission, cellular transmission, Internet link, or any other communications medium to a processor. Again, the processor may be separate from the monitors, or it may be integral with one of the monitors such that communication by such monitor is not required except to deliver the data from the sensor to the integral processor. In fact, the processor used in step 60 may be the same processor as that used in step 54, or the processors may be different processors. Also optionally, each monitor may communicate via the same type of communications medium, or different monitors may use different media.

Figure 4:
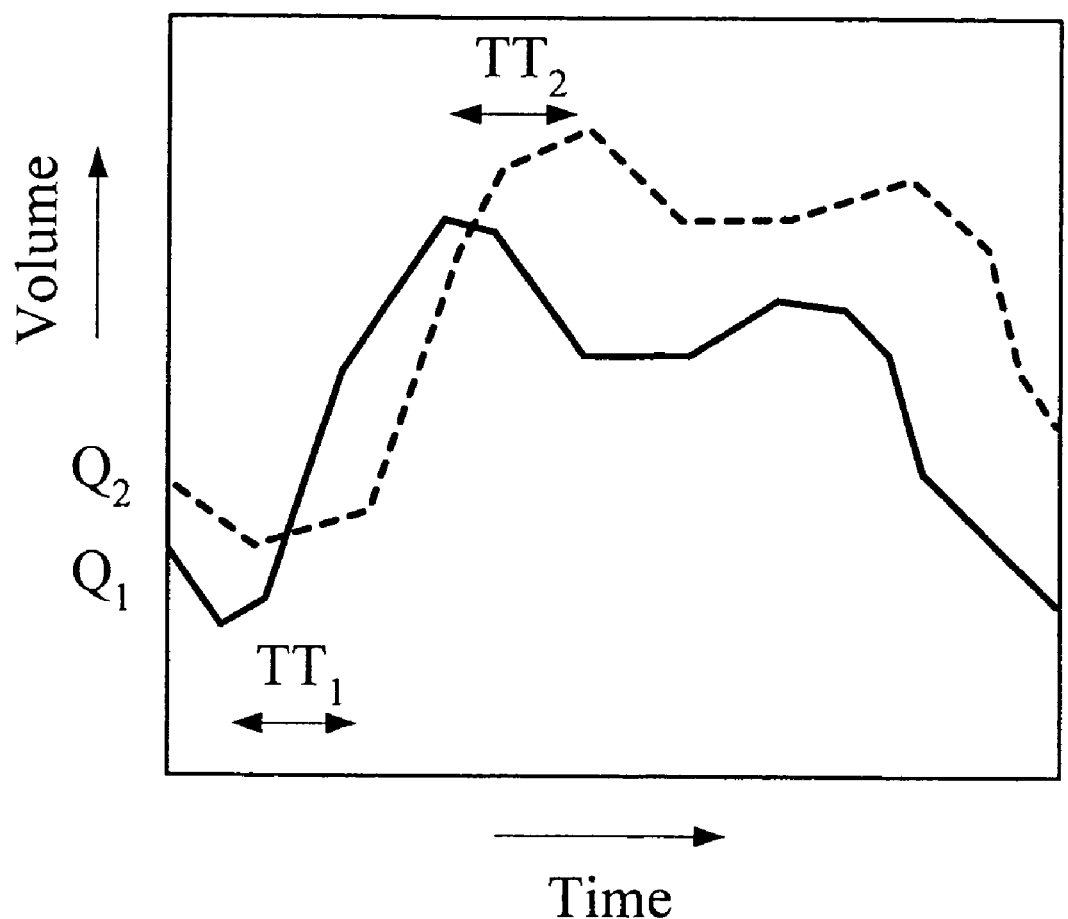
FIG. 4 is a diagram illustrating how the results of the present invention may have application for use in the analysis of flow in an exemplary sewer network in which the measured flow may be more accurately understood when the travel time is taken into consideration.

FIG. 4 illustrates an exemplary application of the identification of travel time to an analysis of net flow. FIG. 4 provides two exemplary scatterplots of flow volume data over time. The solid line, represented by $Q_1$, is a plot of flow volume data from a hypothetical upstream flow monitor in a hypothetical sewer network. The dotted line, represented by $Q_2$, is a plot of flow volume data from a hypothetical downstream flow monitor in the same sewer network. The time between selected peaks or valleys of the two scatterplots illustrates the travel time $TT_1$ or $TT_2$ that it took the flow corresponding to the peak or valley of $Q_1$ to travel from the upstream monitor location to the downstream monitor location. In general, in any given network, monitor locations that are further apart will yield longer travel times, while monitor locations that are closer together will yield shorter travel times. Thus, travel times will vary at different times based on locations and network conditions.

The differences in flow volume between the peaks and valleys of each scatterplot will depend on the wastewater discharge sources, inflow and infiltration, and other inputs into the sewer network. In addition, if for example the peaks of a downstream scatterplot do not show an increase, or if they show a smaller increase than is expected, when compared to peaks on an upstream scatterplot, a sewer network manager may recognize that there is a problem within the sewer between the monitor locations. Such a problem may include, for example, a leak, a sewer pipe break, a clog or other obstruction, or an overflow condition.

Figure 5:
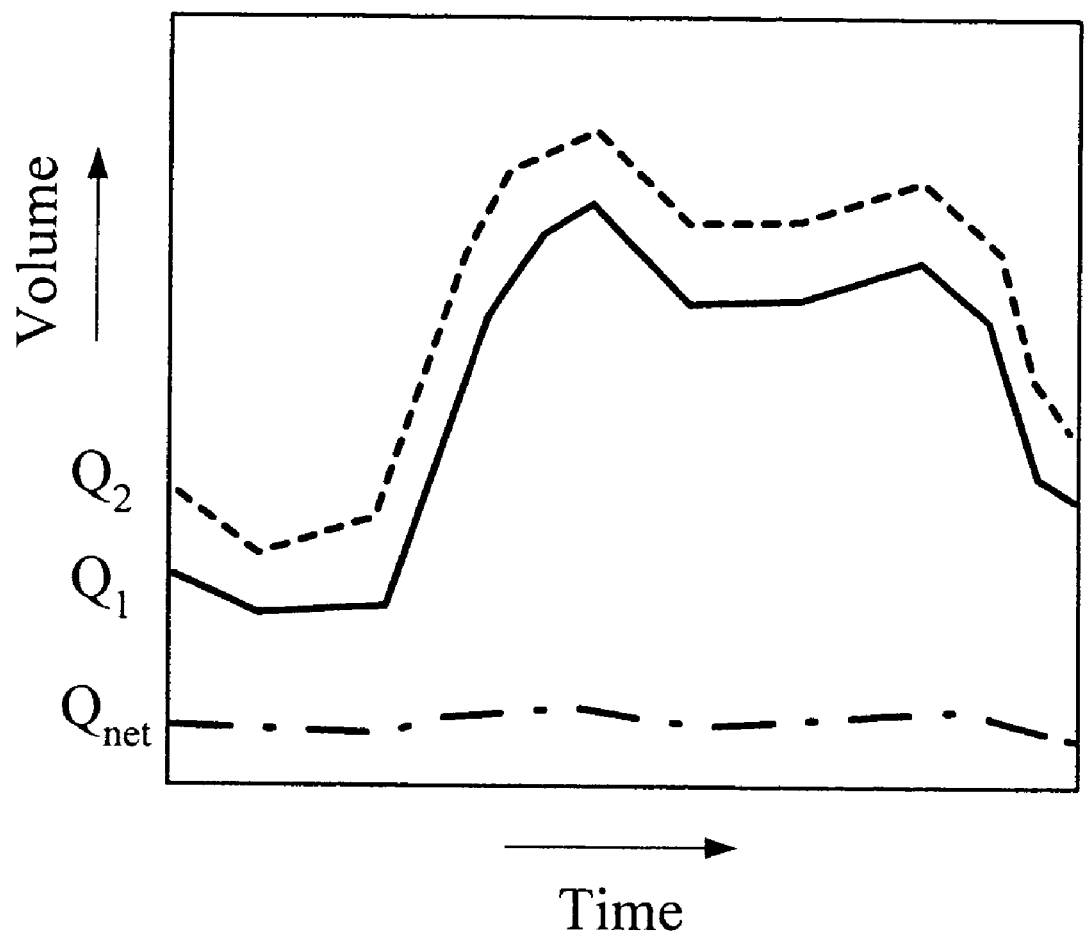
FIG. 5 illustrates the exemplary flow measurements of FIG. 4 after compensation for travel time.

FIG. 5 illustrates the use of the scatterplots of FIG. 4, along with the travel time, to calculate net flow between the hypothetical upstream and downstream monitors. In FIG. 5, the downstream flow volume scatterplot, represented by $Q_2$, has been adjusted to compensate for the travel time. The net flow, represented by $Q_{net}$, is a plot of the difference between $Q_2$ and $Q_1$. If a sharp change in the $Q_{net}$ plot occurs, such a change may be indicative in a network problem, such as a leak, blockage, or overflow.

Figure 6:
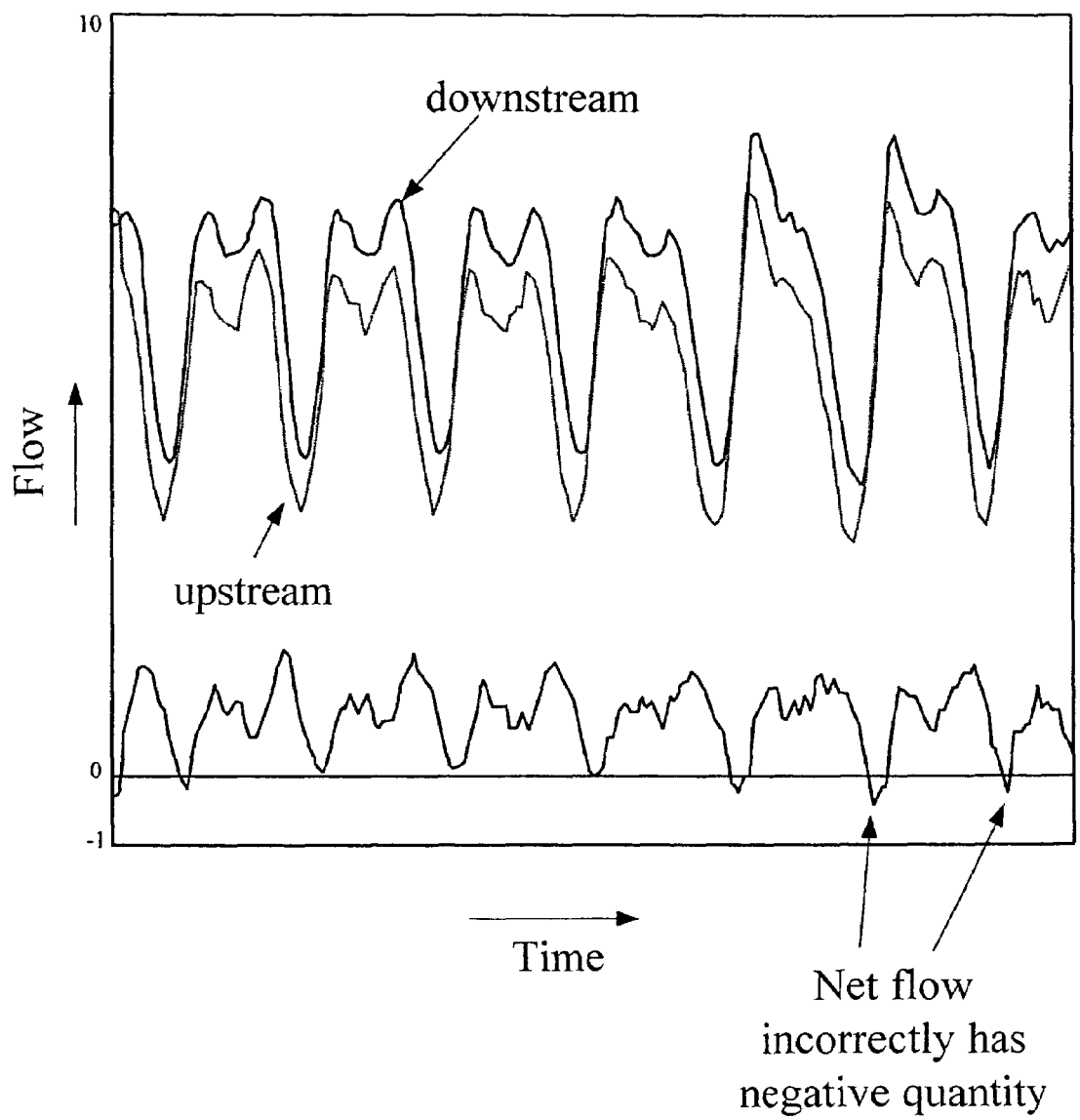
FIG. 6 illustrates an exemplary calculation of net flow when travel time is not considered in the calculation.
Figure 7:
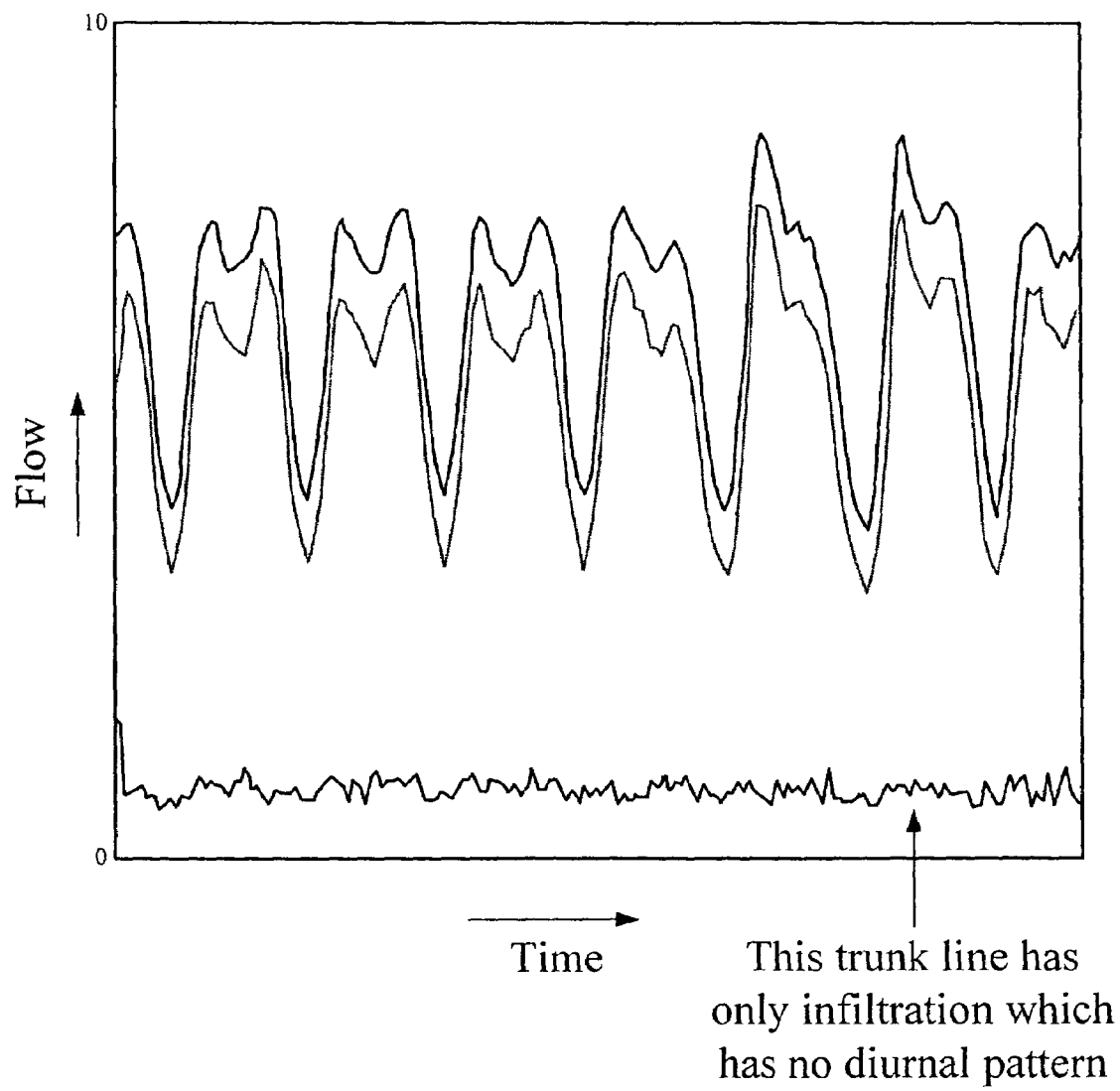
FIG. 7 illustrates an exemplary calculation of net flow when travel time is considered in the calculation.

FIGS. 6 and 7 illustrate an example of how the calculation of travel time can provide for a more accurate calculation of net flow. Referring to FIG. 6, exemplary upstream and downstream flow volume readings are represented at the top of the chart. The bottom of the chart illustrates a calculation of net flow as the difference between the downstream and upstream volumes. Because the net flow calculation in FIG. 6 does not account for travel time, the net flow calculation varies widely, and even may be negative at times. FIG. 7, however, illustrates the effect of an adjustment of the upstream and/or downstream flows to compensate for travel time. Thus, the net flow is a smoother line and is more representative of actual conditions. This allows sewer network managers to more accurately detect variations in net flow that may result from actual network problems. The data used in FIGS. 6 and 7 are merely intended to illustrate an example of the application of the present invention, and are any number of variations are available depending upon the actual data that is collected.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, all of which may fall within the scope of the invention.

What is claimed is:

1. A method of analyzing flow of a substance in a sewer network, comprising:
    collecting first data representative of a first flow velocity of a substance at a first location in a sewer network;
    collecting second data representative of a second flow velocity of the substance at a second location in the sewer network; and
    determining, by a processor, a travel time corresponding to the time it takes for the substance to travel between the first location and the second location, using the first data, the second data, and a constant.

2. The method of claim 1 and further comprising:
    detecting a first flow volume at the first location at a first time;
    detecting a second flow volume at the second location at a second time, the second time being a function of the first time and the travel time;
    transmitting, via the at least one communications link, the first flow volume and the second flow volume to a processor; and
    determining by the processor, a net flow corresponding to a difference between the second flow volume and the first flow volume.

3. The method of claim 1 wherein the determining step requires no addition data relating to the sewer network or the substance.

4. The method of claim 1 wherein the determining step comprises dividing the constant by a sum or an average of the first data and the second data.

5. The method of claim 1 wherein the constant corresponds to historic flow volume data from a first flow meter for the first location and historic flow volume data from a second flow meter for the second location, each of said historic flow volume data relating to a plurality of time increments.

6. The method of claim 1, further comprising developing a distribution of first flow volume data over a period of time and a distribution of second flow volume data over the period of time, and wherein the constant corresponds to a goodness of fit test performed on the distributions.

7. The method of claim 1 wherein the processor is integral with a flow meter that is located at the first location or the second location.

8. A system for analyzing flow of a substance between a first location and a second location, comprising:
 a first meter capable of detecting a first flow velocity at a first location; and
 a second meter capable of detecting a second flow velocity at a second location;
 wherein the first meter and the second meter are in communication with a processor, and the processor is programmed to derive a travel time of a flow from the first location to the second location using the first flow velocity, the second flow velocity, and a constant 9. The system of claim 8 wherein the first meter is also capable of detecting a first flow volume at the first location at a first time, the second meter is also capable of detecting a second flow volume at the second location at a second time, the second time corresponds to a sum of the first time and the travel time, and the processor is further programmed to determine a net flow based on the difference between the second flow volume and the flow volume.

10. The system of claim 8 wherein the processor does not require additional data relating to the flow or the locations.

11. The system of claim 8 wherein the first location and the second location are locations within a sewer network.

12. The system of claim 8 wherein the constant corresponds to historic flow volume data from the first meter for the first location and historic flow volume data from the second meter for the second location, each of said historic flow volume data corresponding to a plurality of increments.

13. The system of claim 8 wherein the processor is integral with the first or second meter.

14. A method of analyzing flow of a substance between a first location and a second location, comprising:
 collecting a first set of flow volume data at a first location over a plurality of time increments;
 collecting a second set of flow volume data at a second location over the plurality of time increments;
 identifying a first distribution of the first set of flow volume data over time;
 identifying a second distribution of the second set of flow volume data over time;
 identifying a constant corresponding to a relation of the first distribution and the second distribution;
 detecting a first flow velocity at the fast location;
 detecting a second flow velocity at the second location; and
 determining a transport time corresponding to a transport of a substance from the first location using the first flow velocity, the second flow velocity, and the constant, wherein the determining step does not require additional data.

15. The method of claim 14, further comprising:
 detecting, using the first flow meter at a first time, a downstream flow volume;
 detecting, using the second flow meter at a second time, a downstream flow volume, the second time corresponding to a sum of the first time and the transport time, and
 calculating a net flow corresponding to a difference between the downstream flow volume and the upstream flow volume.

16. The method of claim 14 wherein the relation in the identifying step comprises a goodness of fit test.

17. A method of analyzing flow of a substance in a sewer network, comprising:
 collecting, using a plurality of upstream flow meters, a plurality of sets of upstream flow volume data, each corresponding to each upstream flow meter over a period of time;
 collecting, using a downstream flow meter, a set of downstream flow volume data over the period of time;
 identifying a plurality of upstream distributions, each corresponding to a set of upstream flow volume data over time;
 identifying a downstream distribution corresponding to the set of downstream flow volume data over time;
 identifying a constant corresponding to a relation of the upstream distributions and the downstream distribution;
 detecting a first flow velocity at a upstream location;
 detecting a second flow velocity at a downstream location corresponding to the downstream flow meter; and
 determining a transport time corresponding to transport of a substance from the upstream location to the downstream location using the first flow velocity, the second flow velocity, and the constant, wherein the determining step does not require additional data.

18. The method of claim 17 further comprising:
 detecting, using a first flow meter selected from the plurality of upstream flow meters at a first time, an upstream flow volume;
 detecting, using the downstream flow meter at a second time, a downstream flow volume, the second time corresponding to a sum of the first time and the travel time; and
 calculating a net flow corresponding to a difference between the downstream flow volume and the upstream flow volume.

19. The method of claim 18 wherein the upstream location corresponds to a location of one of the plurality of upstream flow meters.

20. The method of claim 17 wherein the relation in the identifying step comprises a goodness of fit test.

\* \* \* \* \*